Sept. 2, 1924.  R. M. WASON  1,507,534
OPHTHALMIC FRAME STRETCHER
Filed April 18, 1922
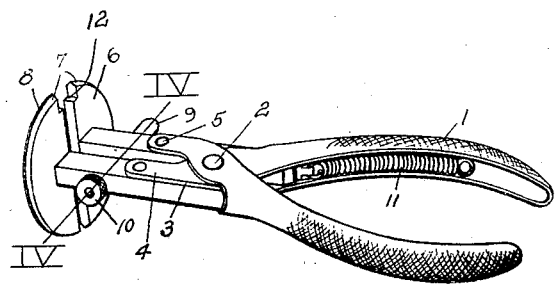
FIG. I
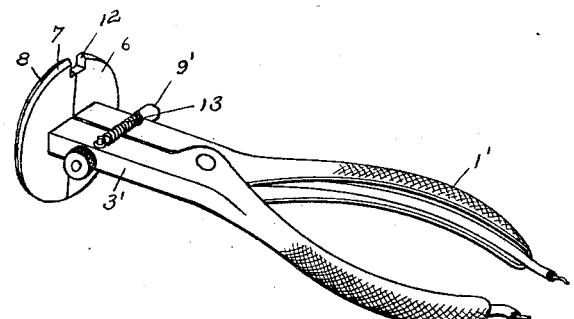
FIG. II
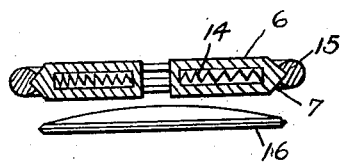
FIG. III
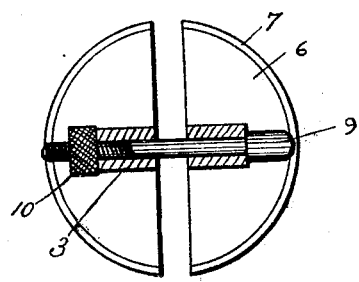
FIG. IV
INVENTOR
R. M. WASON
BY
H. H. Styll & H. K. Parsons
ATTORNEYS Patented Sept. 2, 1924.

1,507,534

UNITED STATES PATENT OFFICE.

ROBERT M. WASON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC-FRAME STRETCHER.

Application filed April 18, 1922. Serial No. 555,048.

*To all whom it may concern:*

Be it known that I, ROBERT M. WASON, a citizen of the United States, residing at Southbridge, in the county of Worcester and State of Massachusetts, have invented certain new and useful Improvements in an Ophthalmic-Frame Stretcher, of which the following is a specification.

This invention relates to new and useful improvements in a lens mounting device and more particularly to the provision of a process and device whereby to quickly and readily mount lenses within the eye wire or frame of spectacle mountings.

The main object of the present invention is the provision of a device adapted to be engaged with the eye wire or lens frame of a spectacle mounting, said device being in a heated condition and adapted to position itself within the lens groove in the eye wire or frame so as to heat and expand the eye wire whereby a lens can be quickly and readily placed in position within the groove of the eye wire so that when the eye wire cools and contracts it will tightly engage the edge of the lens.

Another object of the invention is the provision of a simple tool having a former provided with beveled edges having a central ridge between the bevel portions whereby the edges of the former are being expanded within the groove of the eye wire when in a heated condition and retain the groove of the eye wire, during stretching, in a proper state to readily receive the edge of the lens which is to be placed therein so that when the former is removed from the eye wire the groove of the eye wire will be in the proper condition to receive a seat at the edge of the lens so that when the eye wire cools and contracts the proper grip will be provided for retaining the lens in position within the eye wire.

A further object of the invention is the provision of a process for mounting lenses in the eye wires or frames of a spectacle mounting wherein means is provided for heating a former adapted to engage within the eye wire or lens frame for heating and stretching the same so that it can be readily engaged with the edge of a lens.

With the above and other objects in view the invention consists in the novel features of construction, the combination and arrangement of parts hereinafter more fully set forth, pointed out in the claim and shown in the accompanying drawings, in which—

Figure I is a perspective view of a pair of pliers carrying the former used in carrying out my invention.

Figure II is a similar view illustrating a slightly modified form of the invention.

Figure III is a detail vertical section illustrating the application of the device, and Figure IV is a transverse section taken on the line IV—IV of Figure 1.

In carrying out my invention I provide a pair of handle members 1 pivoted together by means of the pivot pin 2. The ends of the handles beyond the pivot 2 will extend across each other at the pivot points and loosely connected with the movable jaw members 3, said jaw members being pivoted to the link portions 4 of the handles by means of the pivot pins 5.

Secured to the outer end of each of the jaw members 4 is a semicircular form member 6 whereby when two form members are brought together they provide a circular former adapted to be inserted within the eye wire or lens frame of a spectacle mounting and it will be apparent from the above description taken in connection with the accompanying drawings that by pressing the handles inwardly toward each other the two parts of the former will be forced together.

In the process of mounting lenses it is preferred to have the former heated to a certain degree before being placed within the eye wire and attention is directed to the fact that the edge of the former is provided with bevel surfaces 7 having a sharp annular ridge 8 disposed between said bevel surfaces so as to provide a form similar to the outlines defined by the groove upon the interior of the eye wire or frame of the spectacle.

Prior to applying my improved tool the two parts of the former are moved together, after being heated to a certain degree by resting the former upon a heated surface, so as to close the space between the two parts of the former. The former is then reduced to a minimum size which is inserted within the rim or eye wire so that the edges 8 are engaged within the central portion of the groove in the eye wire and from this it will be apparent that after the edge of the former is of substantially the same shape as the groove in the eye wire, the proper shape of the groove in the eye wire will be retained during the heating and stretching of the same so that when the former is released from the eye wire the lens can be quickly and readily inserted in the eye wire and the eye wire remains in a substantially loose condition on the lens until the eye wire has cooled sufficient to provide for the contraction of the same.

In order to adjust the space between the two parts of the former, particularly adjusting the jaw members 4, a pin 9 is extended thru the jaws and provided with a thumb nut 10 whereby the distance between the two jaws may be readily adjusted so as to increase or decrease the diameter of the former while in its normal inoperative state as shown in Figure 1.

In order to retain the handle members 1 in an open position as shown in Figure 1, a coil spring 11 is provided, one end of said spring being connected to one of the handle members and the other end of the spring connected to the inner end of one of the jaw members 3, the tension of said spring being exerted through said jaw member and against the end of the opposite handle to which the jaw member is pivoted. The spring thus serves to swing the handles and jaw members apart or into open position.

In the use of this form of the invention, the handles are pressed together, closing the jaws to permit the ridge 8 of the former sections being properly engaged within the lens receiving groove of the composition rim to be stretched. The adjusting screw 9 and nut 10 are then set to limit the possible separation of the jaws and thus the amount which the frame may be stretched. It is then merely necessary to subject the device to the proper degree of heat, either by standing it on an electric or steam heated plate, by immersing it in hot water, or the like. The heat will serve to soften the composition rim to permit of it being stretched, while the spring acting to separate the jaws will automatically and gradually with a substantially even pressure perform the stretching action. At the same time the adjustable screw stop limits the amount which the frame is stretched irrespective of the period during which it is subjected to the heating or is left on the stretcher. Also the spring keeps the frame stretched and prevents it from shrinking as long as it remains on the formers. When desired to apply the stretched rim to a lens it is merely necessary to press the handles together and release the rim.

In Figure 1 it will be noted that the two sections of the former are cut away to form the recesses 12 upon opposite sides of the central spaces which are adapted to receive the metal clamps formed on the non-metallic eye wire or frames so that the ridge portion 8 can enter the groove of the eye wire freely without any interference on the part of the metal clamp.

In this form of the invention the former can be heated by placing the same upon any heated surface for heating the same to a low degree. After the former is heated it is applied to the eye wire and the eye wire stretched to permit the lens to be readily inserted therein after which the eye wire will cool quickly and contract to bind itself upon the edge of the lens.

In Figure 2 I have illustrated a slightly modified form of the invention wherein the two sections of the former are normally retained in a close position and retained in this position by means of the spring 13, said formers being constructed in the same manner as the formers used in the preferred form of the invention, but after the eye wire has been placed upon the formers they are stretched or expanded by pressing the handle members 1' inwardly toward each other. This form of the invention is also provided with the adjustable pin 9' whereby the jaws 3' may be adjusted toward and away from each other to limit the swinging movement of the same to accommodate various size frames.

In Figure 3 I have illustrated a section showing the application of the stretcher and wherein a heating coil 14 is used for heating the two sections of the former. This heating coil 14 may be connected in any suitable manner to a source of current supply whereby the former can be quickly and readily heated for expanding the eye wires or lens frames 15 so that it can be readily engaged over the lens 16, the cooling and contracting of the frame 15 drawing the same entirely up against the edge of the lens so that in order to remove the same it will be necessary to heat the frame to expand the same from the lens.

From the above description taken in connection with the accompanying drawings it will be readily apparent that I have provided a simple and efficient tool for carrying out an improved process for mounting lenses within the eye wire or frame of spectacle mountings.

Attention is called to the fact that the edges of the former are beveled and ridged so that when they are applied to the eye wire the groove within the eye wire will be retained in its proper shape so that after the eye wire has been heated and expanded to the proper size to readily fit the lens, the edge of the lens will readily fit within the groove of the eye wire and upon cooling and contraction of the eye wire the lens will be properly seated within the same and prevent any lateral movement between the frame and the lens.

I claim:

A device of the character described, comprising a pair of pivoted handles, a jaw member carried by each handle, a semi-circular plate carried by each jaw member, each of said plates having its outer portions shaped to fit within the lens receiving groove of an ophthalmic frame, resilient means to normally urge the semi-circular plates apart to stretch the ophthalmic frame, a shaft received through said jaw members, and means carried by the shaft to stop the separation of the jaws at a predetermined point so that the ophthalmic frame may be stretched to a predetermined size.

ROBERT M. WASON.